(12) United States Patent　　　　(10) Patent No.:　US 12,642,186 B2

Hertzler　　　　　　　　　　　　　　(45) Date of Patent:　　Jun. 2, 2026

(54) BALER TAILGATE PIVOT WITH CONCENTRIC PIVOT ROLL

(71) Applicant: CNH Industrial America LLC, New Holland, PA (US)

(72) Inventor: Todd Hertzler, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 356 days.

(21) Appl. No.: 18/241,418

(22) Filed: Sep. 1, 2023

(65) Prior Publication Data

US 2025/0072333 A1　　Mar. 6, 2025

(51) Int. Cl.
　A01F 15/18　　　(2006.01)
　A01F 15/07　　　(2006.01)
　A01F 15/08　　　(2006.01)

(52) U.S. Cl.
　CPC .............. A01F 15/18 (2013.01); A01F 15/07 (2013.01); A01F 15/0883 (2013.01); *A01F 2015/077* (2013.01); *A01F 2015/186* (2013.01)

(58) Field of Classification Search
　CPC ...... A01F 15/18; A01F 15/07; A01F 15/0883; A01F 2015/077; A01F 2015/186
　See application file for complete search history.

(56) References Cited

U.S. PATENT DOCUMENTS 4,288,971 A　*　9/1981　McClure ............. A01F 15/0883
　　　　　　　　　　　　　　　　　　56/341
4,409,783 A　*　10/1983　Gaeddert ................ A01F 15/07
　　　　　　　　　　　　　　　　　　384/418

5,138,942 A　*　8/1992　Henderson .............. A01F 15/07
　　　　　　　　　　　　　　　　　　100/88
5,327,821 A　*　7/1994　McClure .............. A01F 15/141
　　　　　　　　　　　　　　　　　　100/88
5,598,690 A　*　2/1997　McClure ................ A01F 15/07
　　　　　　　　　　　　　　　　　　100/88
6,332,309 B1　　12/2001　Rodewald
7,140,294 B1　*　11/2006　Anstey ................ A01F 15/0883
　　　　　　　　　　　　　　　　　　100/88
7,380,496 B2　　6/2008　Viaud
7,640,852 B1　*　1/2010　Anstey ................ A01F 15/0883
　　　　　　　　　　　　　　　　　　100/88
10,383,285 B2　　8/2019　Simmons et al.
10,385,605 B2　　8/2019　Limke et al.
11,419,271 B2　　8/2022　De Baere (Continued)

FOREIGN PATENT DOCUMENTS

DE　　　29706540 U1 *　6/1997　............. A01F 15/07
EP　　　0217715 B1　　6/1991

(Continued)

*Primary Examiner* — Arpad Fabian-Kovacs

(74) *Attorney, Agent, or Firm* — Buchanan Ingersoll & Rooney PC

(57) ABSTRACT

An agricultural baler assembly having: a frame; a tailgate pivotally connected to the frame at a tailgate pivot and movable about the tailgate pivot between a closed tailgate position and an open tailgate position, wherein the tailgate and the frame define a bale chamber when the tailgate is in the closed tailgate position; a pivot roller fixed concentric to the tailgate pivot; and a belt wrapped around the pivot roller with the pivot roller between a portion of the belt wrapped around the pivot roller and the bale chamber.

11 Claims, 5 Drawing Sheets

(56)          References Cited

U.S. PATENT DOCUMENTS

| | | | | |
|---|---|---|---|---|
| 2002/0073678 A1 * | 6/2002 | Lucand | .................. | A01F 15/07 56/341 |
| 2010/0326294 A1 * | 12/2010 | Smith | ................ | A01F 15/0833 100/88 |
| 2013/0298787 A1 * | 11/2013 | Simmons | ................ | A01F 15/18 100/76 |
| 2014/0116272 A1 * | 5/2014 | De Craemer | .......... | A01F 15/18 100/88 |
| 2016/0316633 A1 * | 11/2016 | Smith | ................ | A01F 15/0875 |
| 2021/0144927 A1 * | 5/2021 | Shenk | ..................... | A01F 15/18 |
| 2021/0267128 A1 | 9/2021 | Peterson | | |
| 2021/0282330 A1 * | 9/2021 | Peterson | ................ | A01F 15/07 |
| 2022/0015301 A1 | 1/2022 | Derscheid | | |
| 2022/0408654 A1 * | 12/2022 | Schnieders | ......... | A01F 15/0883 |

FOREIGN PATENT DOCUMENTS

| | | | | | |
|---|---|---|---|---|---|
| EP | 1151657 | A1 * | 11/2001 | ......... | A01F 15/0883 |
| EP | 3114920 | A1 * | 1/2017 | ......... | A01F 15/0705 |
| EP | 3847885 | A1 * | 7/2021 | ............ | A01F 15/18 |
| WO | WO-9817097 | A1 * | 4/1998 | .......... | A01F 15/106 |
| WO | WO-2014030150 | A2 * | 2/2014 | .......... | A01F 15/071 |
| WO | WO-2015160242 | A1 * | 10/2015 | ......... | A01F 15/0883 |

* cited by examiner

BALER TAILGATE PIVOT WITH CONCENTRIC PIVOT ROLL

BACKGROUND OF THE INVENTION

The present invention pertains to agricultural balers.

Agricultural harvesting machines, such as balers, are used to consolidate and package crop material so as to facilitate the storage and handling of the crop material for later use. In the case of hay or silage, a mower-conditioner is typically used to cut and condition the crop material. In the case of straw, an agricultural combine discharges non-grain crop material from the rear of the combine defining the straw (such as wheat or oat straw) which is to be picked up by the baler. The cut crop material typically is raked into a windrow, and a baler, such as a large square baler or round baler, straddles the windrows and travels along the windrows to pick up the crop material and form it into bales.

A round baler may generally include a frame, supported by wheels, a hydraulic system, a pickup unit to engage and lift the crop material into the baler, a cutting assembly, a main bale chamber for forming a bale, and a wrapping mechanism for wrapping or tying a material around the bale after it has been formed in the main bale chamber. As the baler is towed over a windrow, the pickup unit lifts the crop material into the baler. Then, the crop material may be cut into smaller pieces by the cutting assembly. As the crop material enters the main bale chamber, multiple carrier elements, e.g. rollers, chains and slats, and/or belts, will begin to roll a bale of hay within the chamber. These carrier elements are movable so that the chamber can initially contract and subsequently expand to maintain an appropriate amount of pressure on the periphery of the bale. After the bale is formed and wrapped by the wrapping mechanism, the rear of the baler is configured to open for allowing the bale to be discharged onto the field.

The carrier elements typically include a serpentine take-up arrangement to allow them to expand to accommodate the growing bale. For example, a belt may be mounted on a combination of stationary rollers and movable rollers. The movable rollers (typically two) are mounted on one or more arms (sometimes called "serpentine arms") to allow them to move away from the center of the bale. The serpentine arms are biased by tensioners (e.g., mechanical or pneumatic springs) or the like to resist movement away from the bale. The belt is wrapped around the movable rollers and a number of stationary rollers in a serpentine manner, so as to stay in contact with the rollers as the movable rollers move. As the bale increases in size, the portion of the belt that wraps around the bale increases in length. The serpentine portion of the belt that wraps around the stationary rollers and movable rollers decreases in length to provide additional belt length that allows the bale to increase in diameter. As the bale grows, the movable rollers move towards the stationary rollers, reducing the serpentine belt length (i.e., the length wrapping around and extending between the fixed and corresponding movable rollers), and increasing the length of the belt wrapping around the circumference of the bale. During this operation, the movable rollers, and more specifically the tensioner acting on the serpentine arm, generates belt tension that compresses the bale to the desired density.

The inventors have determined that further improvements can be made to agricultural baler machines.

This description of the background is provided to assist with an understanding of the following explanations of exemplary embodiments, and is not an admission that any or all of this background information is necessarily prior art.

SUMMARY OF THE INVENTION

In one exemplary aspect, there is provided an agricultural baler assembly comprising: a frame; a tailgate pivotally connected to the frame at a tailgate pivot and movable about the tailgate pivot between a closed tailgate position and an open tailgate position, wherein the tailgate and the frame define a bale chamber when the tailgate is in the closed tailgate position; a pivot roller fixed concentric to the tailgate pivot; and a belt wrapped around the pivot roller with the pivot roller between a portion of the belt wrapped around the pivot roller and the bale chamber.

In another exemplary aspect, there is provided a method for operating an agricultural baler comprising a frame, a tailgate pivotally connected to the frame at a tailgate pivot and movable about the tailgate pivot between a closed tailgate position in which the tailgater and the frame form a bale chamber and an open tailgate position, a pivot roller fixed concentric to the tailgate pivot, and a belt wrapped around the pivot roller with the pivot roller between a portion of the belt wrapped around the pivot roller and the bale chamber. The method comprises: operating the belt to enlarge a bale in a bale chamber; increasing a length of a portion of the belt wrapped around the bale as the bale enlarges; decreasing a length of a take-up portion of the belt as the bale enlarges; pivoting the tailgate relative to the frame at the tailgate pivot and about the pivot roller to the open tailgate position; and ejecting the bale from the agricultural baler.

BRIEF DESCRIPTION OF THE DRAWINGS

Embodiments of inventions will now be described, strictly by way of example, with reference to the accompanying drawings, in which.

In the figures, like reference numerals refer to the same or similar elements.

DETAILED DESCRIPTION OF THE DRAWINGS

Exemplary embodiments are described herein as a baler including a serpentine pivot roll, which can provide greater ability to handle relatively large bales. However, embodiments can provide other benefits, regardless of the bale size, and it will be understood that embodiments are not limited to particular dimensional or functional requirements unless specifically claimed with such limitations. Additionally, embodiments may be used with any type of agricultural baler, including, for example, those that are configured as towed balers and those that are configured as self-driving balers.

The terms "forward," "rearward," "left" and "right," when used in connection with the agricultural baler and/or components thereof are usually determined with reference to the direction of forward operative travel of the towing vehicle, but they should not be construed as limiting. The terms "longitudinal" and "transverse" are determined with reference to the fore-and-aft direction of the driving and are equally not to be construed as limiting.

Figure 1:
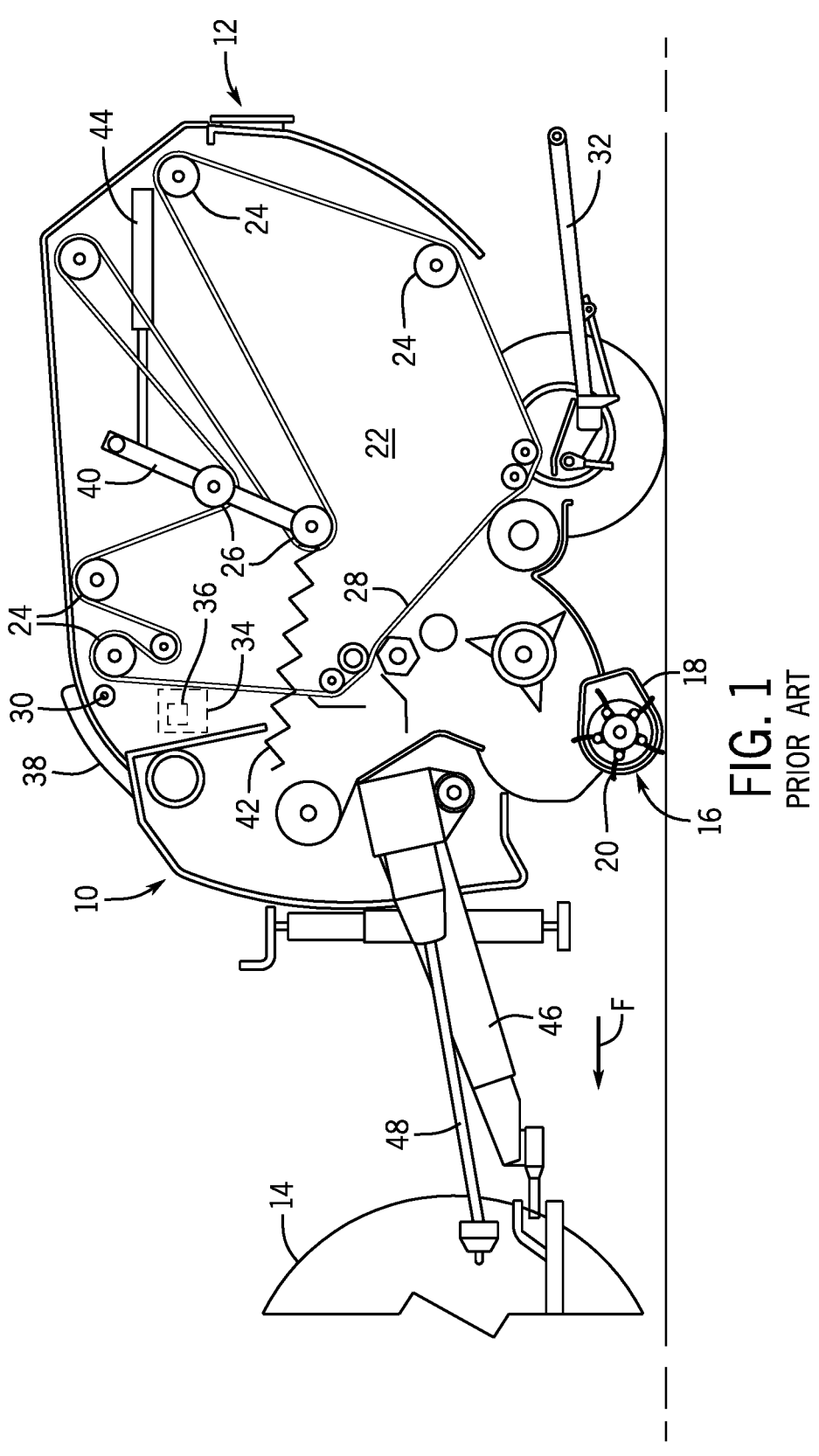
FIG. 1 is a schematic side view of a prior art agricultural baler.

A typical prior art agricultural round baler 10 is shown in FIG. 1, in a configuration to be towed in a forward direction F behind a tractor 14 or other vehicle. In examples herein, the transverse direction extends orthogonal to the page. Crop material is lifted from windrows into the baler 10 by a pickup unit 16. The pickup unit 16 includes a rotating pickup reel 18 with tine bars and tines 20 that move the crop rearward toward a variable bale chamber 22. The reel 18 is rotatable in an operating direction for lifting the crop material off of the ground and may also be operable in a reverse direction, i.e., opposite to the operating direction.

The bale chamber 22 is configured as a variable bale chamber 22 having stationary rollers 24, movable rollers 26, and at least one belt 28 that wraps around the rollers 24, 26. For purposes of this explanation, the term "belt" refers to any type of movable conveyance that is used to wrap the bale, such as chains, woven belts, linked belts, slats, and the like, and also refers to any number of such belts as may be arranged to operate in parallel (e.g., multiple belts wrapped around the rollers 24, 26 and positioned adjacent to each other in the transverse direction). Similarly, a "roller" includes any number of rollers spaced in the transverse direction along a common rotation axis, and rollers having any surface structure (e.g., smooth, cogged, ribbed, etc.). The rollers 24, 26 may comprise a floor roller, starter roller, stationary roller(s), pivot roller(s), stripper roller, follower roller(s), and so on. The movable rollers 26 are mounted on movable supports, typically pivotable arms 40, and tensioners 42 (e.g., one or more mechanical springs or pneumatic accumulators connected to hydraulic cylinders to form a pneumatic spring) are provided to bias the movable rollers 26 to a starting position when there is no bale in the bale chamber 22. One or more actuators 44 may be provided to positively control the positions of the serpentine arms 40 and thus the movable rollers 26.

Together, the rollers 24, 26 and the belt(s) 28 create a circulating chamber 22 that expands between an empty bale position and a full bale position for engaging and rolling the bale. As the bale grows inside the chamber 22 it begins to act upon the belts 28 such that the belts 28 pull the serpentine arms 40 against the springs 42, which in turn causes the movable rollers 26 to move away from the center of the bale so that the variable bale chamber 22 incrementally expands with the size of the bale.

When the bale reaches a predetermined size, the bale is wrapped with a wrapping material (e.g., mesh, twine or polymer sheet) by a wrapper. Then, once fully wrapped, the bale is ejected out of the tailgate 12. The tailgate 12 may pivot upwardly about pivot 30 to open the bale chamber 22. In examples herein, the pivot 30 defines a pivot axis that extends in the transverse direction. Then, ejected bale rolls out of the bale chamber 22 and onto a bale ejector or kicker 32, which pushes the bale rearwardly away from the baler 10 so that the tail gate 12 may pivot back down without hitting the ejected bale.

The baler 10 can further include an electrical processing circuit 34, e.g., a controller 34 with a memory 36, for conducting various baling procedures. For instance, the controller 34 can be configured for carrying out the bale discharge operation. Hence, the controller 34 may open the tailgate 12 via accompanying actuators upon sensing a full bale condition by a bale-size sensor.

The baler 10 has a main frame 38 that supports the various components of the baler 10, including the roller fixation points, drives, tailgate pivot 30, and other features, such as a tow arm 46, power take-off 48, and the like.

The foregoing structures and additional features are generally known in the art, and need not be described herein in more detail.

It has been found that making a larger bale requires the length of the take-up portion of the belt 28 to be increased when the movable rollers 26 are in the no-bale condition, in order to take up all of the slack when there is no bale in the bale chamber, and to allow the belt to reach the ultimate desired size. This can be done by increasing the length of the serpentine arm, which allows the movable rollers to move farther from the stationary rollers in the no-bale condition and thus increases the lengths of the belt segments between the movable rollers 26 and the adjacent stationary rollers 24. However, this can give the growing bale greater mechanical advantage to push against the arm 40, and thus reduce the compression load on the bale. Thus, it becomes necessary to increase the amount of load placed on the arm 40 to keep the bale tight. This leads to greater baler frame strength, operating power requirements, and other disadvantages.

The length of the take-up portion of the belt 28 in the no-bale condition can also be increased by adding more rolls to the pivoting serpentine arm. For example, it is known to provide two rollers on one side of the serpentine arm pivot, and one roller on the other side of the serpentine arm pivot. This arrangement can increase the length of the serpentine arm to take up more belt in the no-bale condition, but also can lead to increased operating loads and power requirements, and does not necessarily address other problems.

Figure 2:
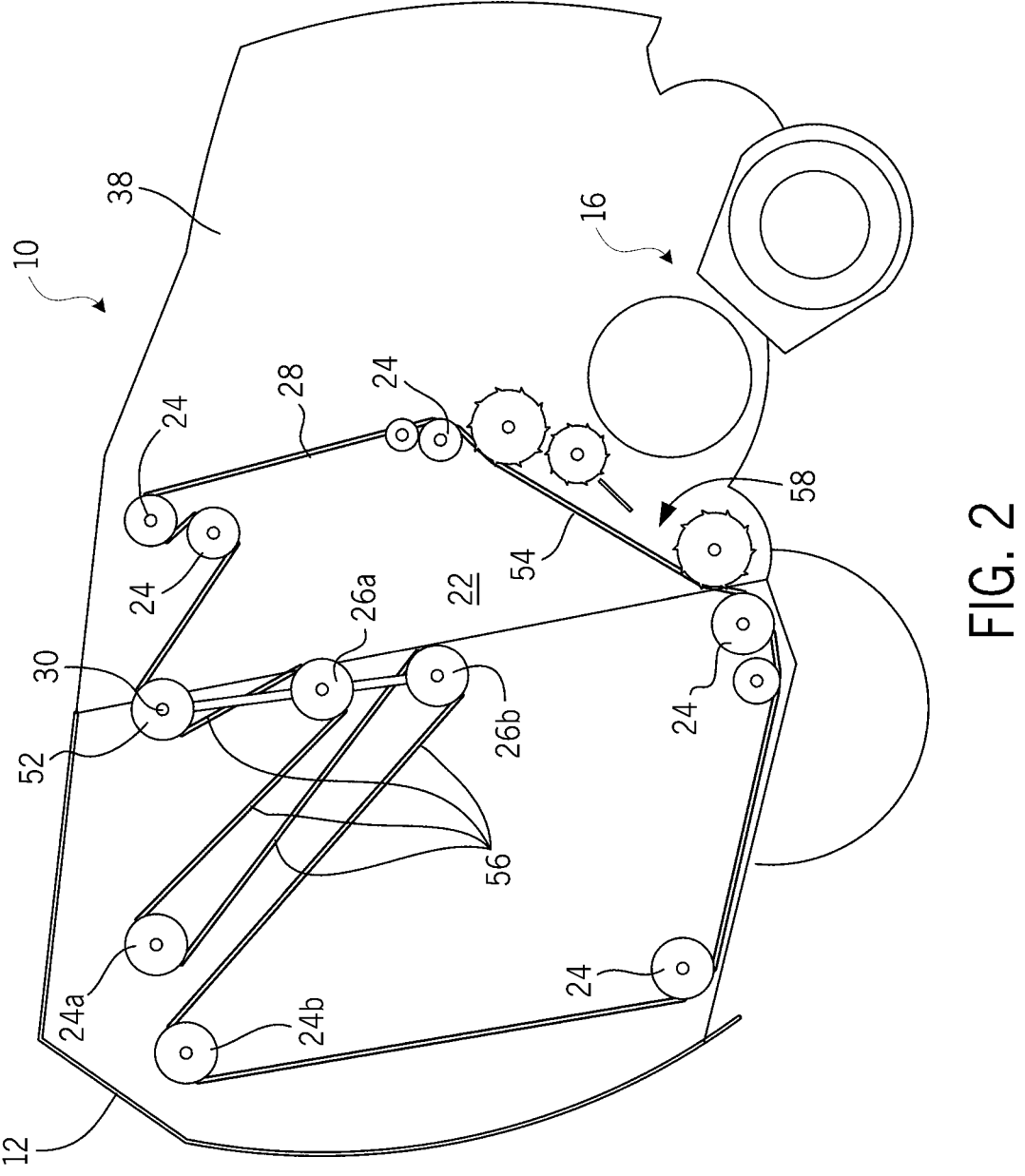
FIG. 2 schematically illustrates a baler without a bale in the bale chamber (i.e., in the no-bale condition).
Figure 3:
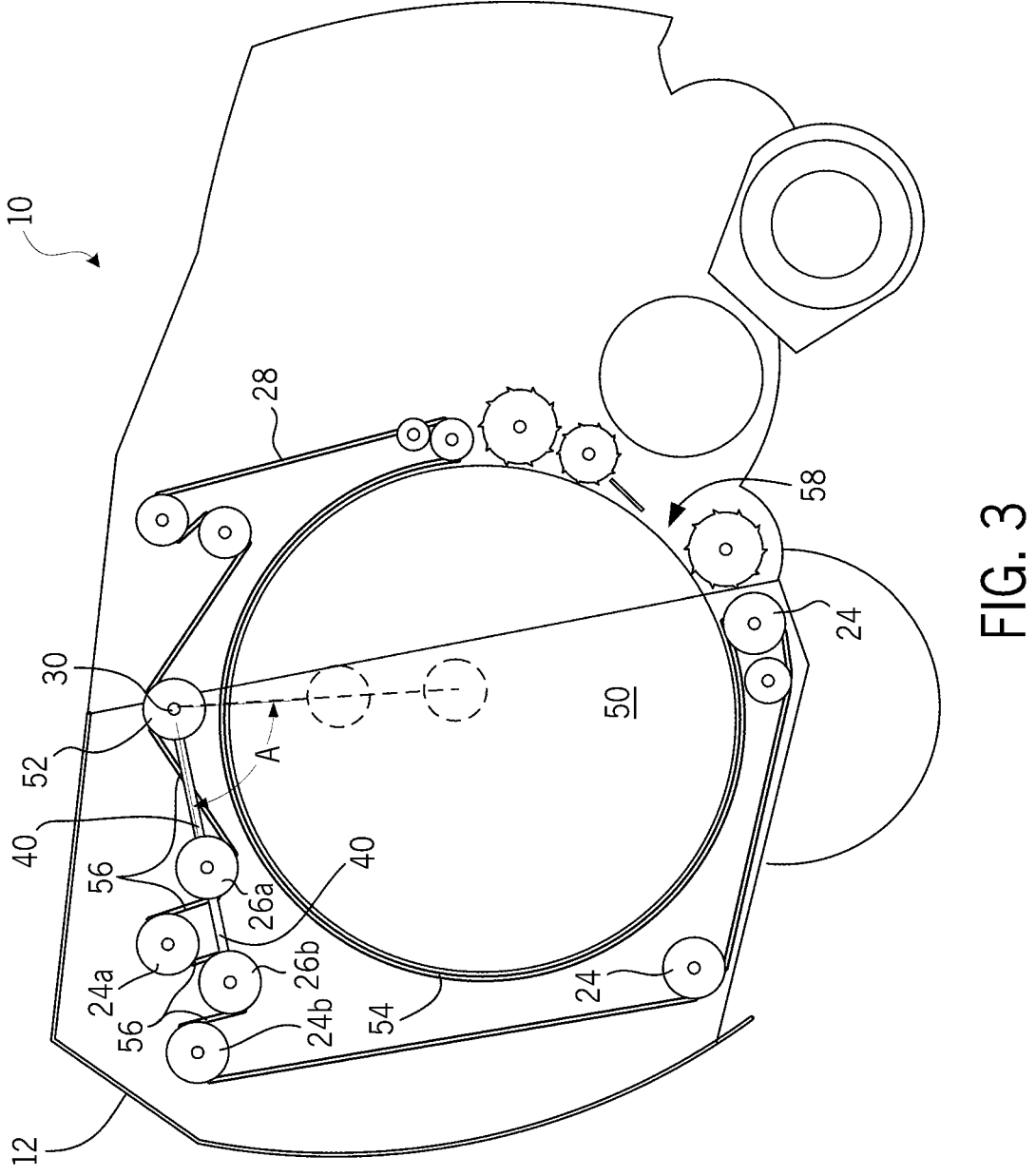
FIG. 3 schematically illustrates the baler of FIG. 3 with a maximum-size bale in the bale chamber.
Figure 4:
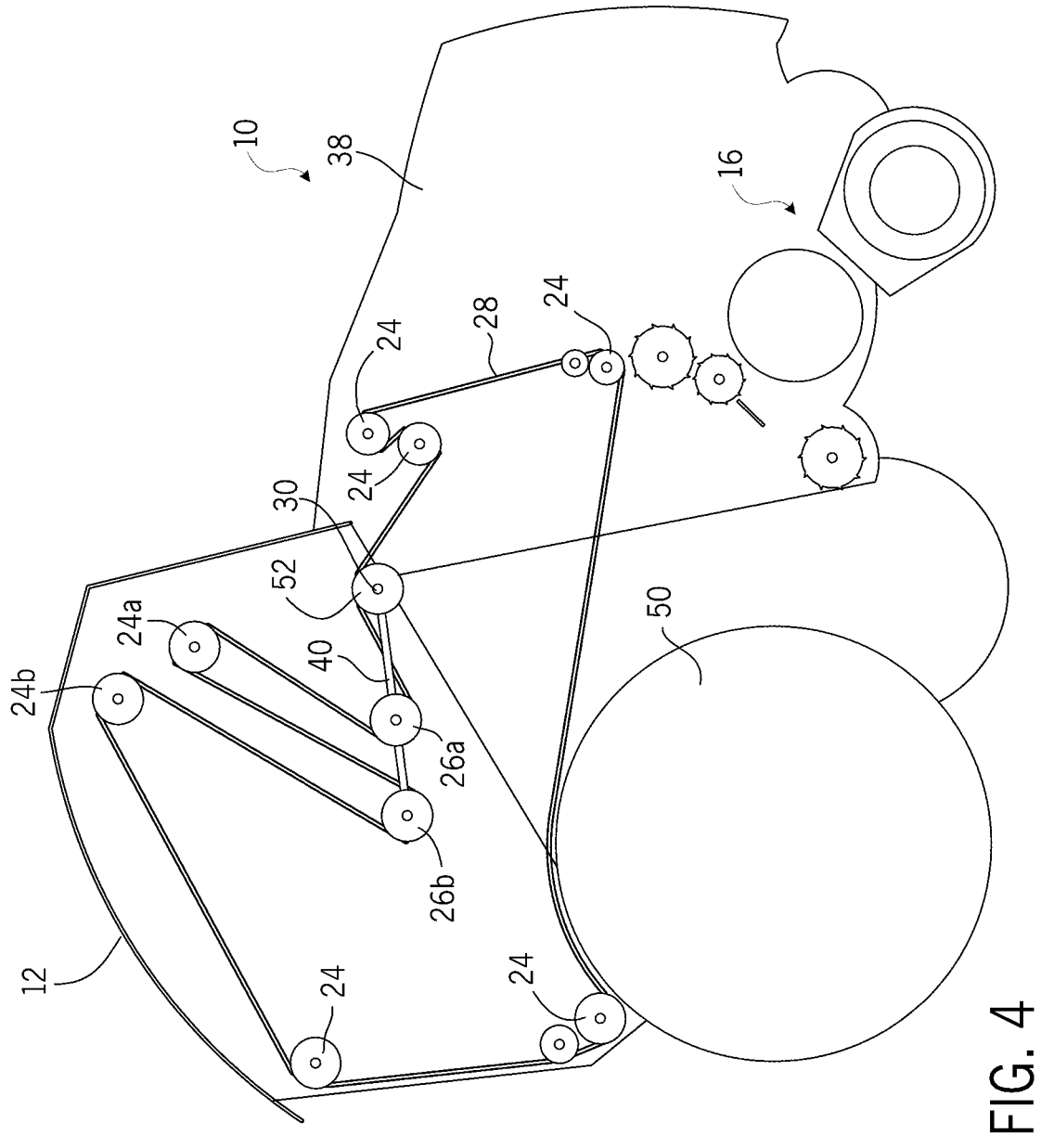
FIG. 4 schematically illustrates the baler of FIG. 3 with the tailgate open to eject the bale.

FIGS. 2-4 illustrate an example of an agricultural baler 10 having a modified baler assembly that is expected to favorably address the limitations in conventional balers with respect to accommodating larger bales, while still providing the desired bale compression and adequately taking up slack in the belt when no bale is present in the bale chamber. For clarity, various conventional features, such as actuators 44, tensioners 42 and the like are not shown in FIGS. 2-4.

FIGS. 2-4 show a baler 10 in various states of operation. In FIG. 2, the baler 10 is shown without a bale in the bale chamber 22. FIG. 3 shows the baler 10 with a bale 50 in the bale chamber 22. FIG. 4 shows the baler 10 with the tailgate 12 pivoted relative to the frame 38 about the tailgate pivot 30, to open the baler chamber 22 and eject the bale 50.

The baler 10 includes a frame 38, a tailgate 12 pivotally connected to the frame 38 at a tailgate pivot 30. The tailgate 12 is movable about the tailgate pivot 30 between a closed tailgate position (FIGS. 2 and 3) and an open tailgate position (FIG. 4). The tailgate 12 and the frame 38 define the bale chamber 22 when the tailgate 12 is in the closed tailgate position.

The baler 10 includes a plurality of stationary rollers 24, each of which is rotatable about a respective rotation axis. One or more of the stationary rollers 24 are fixed to the frame 38, and one or more of the stationary rollers 24 are fixed to the tailgate. The baler 10 also includes one or more movable rollers 26 that are configured to move relative to the frame 38 between a home position, as shown in FIG. 2, and a raised position, as shown in FIG. 3. The home position corresponds to the state in which the tailgate is fully closed, and there is no bale in the baler chamber 22, and the maximum contraction position corresponds to the state in which the tailgate 12 is fully closed and a bale 50 having a maximum size (i.e., maximum nominal or rated size for normal operating conditions) is located in the baler chamber 22. The movable rollers 24 may be mounted to the frame 38 or the tailgate 12, or effectively to both the frame 38 and the tailgate 12 at the pivot connection 30 between the frame 38 and the tailgate 12

The baler 10 also includes a pivot roller 52 that is mounted concentric to the tailgate pivot 30, such that the pivot roller 52 rotates about the same axis as the tailgate pivot 30. A belt 28 is wrapped in a serpentine path around the stationary rollers 24, movable rollers 26, and pivot roller 52, such that the belt 28 wraps around opposite sides of consecutive rollers 24, 26, 52 along the serpentine path. The serpentine path of the belt 28 is configured such that the belt 28 is wrapped around the pivot roller 52 with the pivot roller 52 between the belt 28 and the bale chamber 22. As shown in FIG. 2, this provides additional space for the bale 50 to grow, as compared to a conventional design in which a portion 60 of the belt 28 might pass between the pivot 30 and the bale chamber 22. It will be appreciated that a belt 28 that is arranged in a serpentine path may include some portions that are not serpentine (i.e., portions of the belt 28 may wrap around the same side of two adjacent fixed rollers such as shown at the bottom of the tailgate 12). The term "serpentine" includes belts 28 with some non-serpentine portions.

The belt 28 generally has three operating portions: a bale wrap portion 54 that receives the crop material from the pickup unit 16 via a bale chamber inlet 58, a take-up portion 56 defined between the movable rollers 26 and each adjacent roller along the serpentine path, and fixed portions that extend between the bale wrap portion 54 and take-up portion 56. In this example, the take-up portion 56 is defined by a first length extending between the pivot roller 52 and a first movable roller 26a, a second portion extending between the first movable roller 26a and a first adjacent fixed roller 24a, a third portion extending between the first adjacent fixed roller 24a and a second movable roller 26b, and a fourth portion extending between the second movable roller 26b and a second adjacent fixed roller 24b.

In operation, as the bale 50 increases in size, the length of the bale wrap portion 54 increases, and the length of the take-up portion 56 decreases. The length of the take-up portion 56 is decreased by moving the movable rollers 26 towards the adjacent rollers 52, 26a, 26b (i.e., by moving the movable rollers 26 from the maximum extended position towards the maximum contracted position). In the illustrated example, the first movable roller 26a rotates concentrically to the pivot roller 52 and the tailgate pivot 30, and therefore the stretch of the take-up portion 56 extending between the pivot roller 52 and the first movable roller 26a remains at a constant length, but the remaining stretches of the take-up portion 56 decrease in length. In other cases, the first movable roller 26a may rotate about a pivot axis that is offset from the tailgate pivot 30 and pivot roller 52 axis, in which case the stretch of the take-up portion 56 extending between the pivot roller 52 and first movable roller 26a may increase or decrease in size as the movable rollers 26 move towards the maximum contracted position.

The foregoing embodiment has two movable rollers 26 that are mounted on a single arm arrangement 40 (e.g. two separate arms 40 spaced along the transverse direction and holding the ends of the movable rollers 26 on bearings). The first and second movable rollers 26a, 26b are spaced at different respective distances from the movable roller pivot, which in this case is concentric with the tailgate pivot 30, with the second movable roller 26b being further from the tailgate pivot 30 than the first movable roller 26a.

Other embodiments may have a single movable roller 26, or more than two movable rollers 26. The movable rollers 26 may be mounted on a single pivoting arm 40, such as shown, or mounted on separate arms. The movable rollers 26 also may be mounted on other movable mechanisms, such as four-bar linkages, sliders, or combinations of such mechanisms.

One or more tensioners 42 may be provided to bias the movable rollers 26 towards the home position, and one or more actuators 44 may be provided to move the movable rollers 26 towards their raised position. Other alternatives and embodiments will be apparent to persons of ordinary skill in the art in view of the present disclosure.

As noted above, the use of a pivot roller 52 that is concentric to the tailgate pivot 30 is expected to provide a benefit by providing greater room in the bale chamber 22 for the bale 50 to grow. This benefit can be obtained without the disadvantages (e.g., greater frame strength and tensioner load requirements) of simply increasing the spacing of the movable rollers 26 further from their pivot location. In some cases, the length of the arm 40 (i.e., distance to the furthest movable roller 26) may even be decreased, while still avoiding belt-on-belt contact in the home position. Furthermore, these benefits can potentially be obtained without otherwise changing the design of an existing baler 10 in any significant way. It will be understood that, while such benefits are expected to be available, they are not strictly required in all embodiments.

A further potential advantage of embodiments is that, in at least some cases, the movable rollers 26 may be configured such that they pivot relative to their pivot location by no more than 110°, and more preferably by no more than 90°, between the home position and the maximum contraction position (this measurement does not include any further rotation that might occur as the tailgate 12 is opened to eject the bale, which can move the movable rollers 26 beyond the maximum contraction position). For example, as shown in FIG. 3, the arm 40 upon which the movable rollers 26 are mounted may move through an angle A of 90° or less as the movable rollers 26 move from the home position to the maximum contraction position. This allows the tensioner 42 and actuator 44 to be positioned to act on the arm 40 through a relatively limited range of incident angles. For example, the tensioner 42 or actuator 44 may be positioned to be perpendicular to the arm 40 when the arm is midway between the home position and the maximum contraction position. This can reduce the total variance of forces acting to bias the arm 40, leading to less stringent strength and loading requirements.

Figure 5:
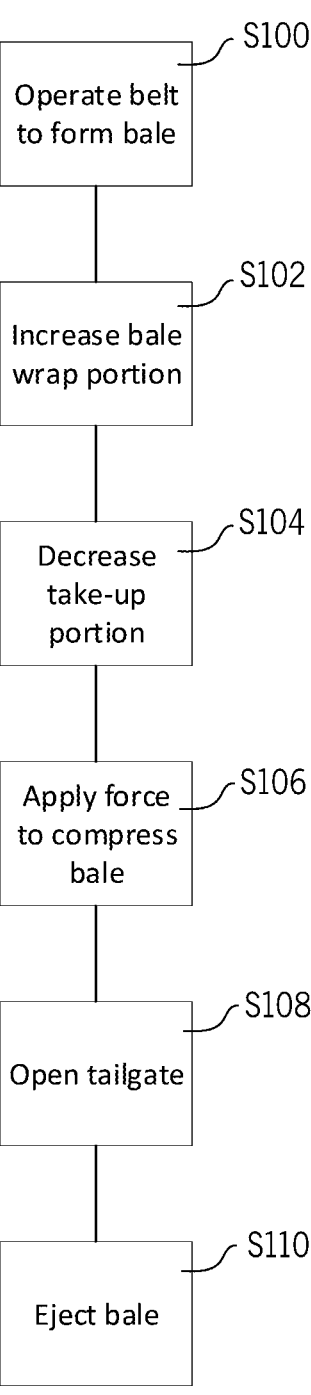
FIG. 5 is a flow chart illustrating a method for operating an agricultural baler.

From the foregoing, it will be appreciated that embodiments may provide a method for operating an agricultural baler to achieve various potential benefits. An example of a method is shown in FIG. 5. The method starts in step S100, in which the belt 28 is operated to enlarge a bale 50 located in the bale chamber 22. In step S102, the length of the bale wrap portion 54 of the belt 28 is increased as the bale enlarges. Simultaneously with step S102, in step S104, the length of the take-up portion 56 of the belt 28 is decreased as the bale enlarges. In step S106, which also may be simultaneous with step S102, a force is applied to the one or more movable rollers 26 to generate a tension load in the bale wrap portion 54, to compress the bale 50. In step S108, the tailgate 12 is pivoted relative to the frame 38 at the tailgate pivot 30, and about the pivot roller 52, to the open tailgate position. In step S110 the bale 50 is ejected from the baler 10.

In step S104, the length of the take-up portion 56 of the belt 28 may be decreased as the bale enlarges by rotating the movable roller(s) relative to its pivot through a range of less than 90° between a home position in which there is no bale in the bale chamber, and a maximum contraction position in which the bale reaches a maximum size. Other steps will be apparent in view of this disclosure and with practice of embodiments.

The present disclosure describes a number of inventive features and/or combinations of features that may be used alone or in combination with each other or in combination with other technologies. The embodiments described herein are all exemplary, and are not intended to limit the scope of the claims. It will be appreciated that various aspects of the embodiments described herein may be provided as component parts or as subassemblies. It will also be appreciated that the inventions described herein can be modified and adapted in various ways, and all such modifications and adaptations are intended to be included in the scope of this disclosure and the appended claims.

It will also be understood that the description herein and the claims describe features that may be combined with other features not specifically described. For example, a counterknife as described and claimed herein may be used in conjunction with other, conventional counterknives, and so on. Also, features identified in the singular or by a specific number are not intended to be limited to a single features or the described number of features unless specifically recited as being present only in the specified quantity.

The invention claimed is:

1. An agricultural baler assembly comprising:
a frame;
a tailgate pivotally connected to the frame at a tailgate pivot and movable about the tailgate pivot between a closed tailgate position and an open tailgate position, wherein the tailgate and the frame define a bale chamber when the tailgate is in the closed tailgate position;
a pivot roller fixed concentric to the tailgate pivot;
a moveable roller assembly comprising an arm and one or more moveable rollers that are fixed to the arm and rotatable about their respective axes, the arm of the moveable roller assembly being fixed to the frame or the tailgate at a movable roller pivot that is concentric to the tailgate pivot, the moveable roller assembly being pivotable about the movable roller pivot relative to both the frame and the tailgate between a home position and a raised position; and
a belt wrapped around the pivot roller and the one or more moveable rollers with the pivot roller arranged between a portion of the belt wrapped around the pivot roller and the bale chamber.

2. The agricultural baler assembly of claim 1, further comprising:
a plurality of stationary rollers comprising:
a plurality of first stationary rollers mounted in a fixed relation to the frame;
a plurality of second stationary rollers mounted in a fixed relation to the tailgate;
wherein the belt is wrapped in a serpentine path around the plurality of first stationary rollers, the plurality of second stationary rollers, the one or more movable rollers, and the pivot roller; and
wherein a take-up portion of the belt extending from each of the one or more movable rollers to each respective adjacent stationary roller along the serpentine path has a maximum length when each of the one or more movable rollers is in the home position when there is no bale in the bale chamber, and a minimum length when each of the one or more movable rollers is in the raised position when a bale of a maximum size is in the bale chamber.

3. The agricultural baler assembly of claim 1, wherein the one or more movable rollers comprises at least a first movable roller mounted to the arm at a first distance from the movable roller pivot, and a second movable roller mounted to the arm at a second distance from the movable roller pivot, wherein the second distance is greater than the first distance.

4. The agricultural baler assembly of claim 1, wherein the one or more movable rollers are rotated relative to the movable pivot roller through a range of less than 90° between the home position and the raised position.

5. The agricultural baler assembly of claim 1, further comprising at least one tensioner configured to bias the one or more movable rollers to the home position.

6. The agricultural baler assembly of claim 1, further comprising at least one actuator configured to move the one or more movable rollers to the raised position.

7. A method for operating an agricultural baler comprising (i) a frame, (ii) a tailgate pivotally connected to the frame at a tailgate pivot and movable about the tailgate pivot between a closed tailgate position in which the tailgater and the frame form a bale chamber and an open tailgate position, (iii) a pivot roller fixed concentric to the tailgate pivot, (iv) a moveable roller assembly comprising an arm and one or more moveable rollers that are fixed to the arm and rotatable about their respective axes, the arm of the moveable roller assembly being fixed to the frame or the tailgate at a movable roller pivot that is concentric to the tailgate pivot, the moveable roller assembly being pivotable about the movable roller pivot relative to both the frame and the tailgate between a home position and a raised position, and (v) a belt wrapped around the pivot roller and the one or more moveable rollers with the pivot roller arranged between a portion of the belt wrapped around the pivot roller and the bale chamber, the method comprising:
operating the belt to enlarge a bale in a bale chamber;
increasing a length of a portion of the belt wrapped around the bale as the bale enlarges;
decreasing a length of a take-up portion of the belt as the bale enlarges;
pivoting the tailgate relative to the frame at the tailgate pivot and the moveable roller pivot and about the pivot roller to the open tailgate position; and
ejecting the bale from the agricultural baler.

8. The method of claim 7, wherein the take-up portion of the belt is defined between the one or more movable rollers and respective adjacent stationary rollers, and the method further comprises applying a force to the one or more movable rollers to generate a tension load in the portion of the belt wrapped around the bale to thereby generate a compression load on the bale.

9. The method of claim 8, wherein decreasing the length of a take-up portion of the belt as the bale enlarges comprises pivoting the one or more movable rollers about the movable roller pivot towards the respective adjacent stationary rollers to thereby reduce a length of a portion of the belt extending from the one or more movable rollers to the respective adjacent stationary rollers.

10. The method of claim 7, wherein the one or more movable rollers comprises at least two movable rollers.

11. The method of claim 9, wherein decreasing the length of a take-up portion of the belt wrapped around the one or more movable rollers as the bale enlarges comprises:

rotating the one or more movable rollers relative to the movable pivot roller through a range of less than 90° between the home position in which there is no bale in the bale chamber and the raised position in which the bale reaches a maximum size before pivoting the tailgate to the open tailgate position.

\* \* \* \* \*